United States Patent
Rieter, Jr.

[11] 3,848,428
[45] Nov. 19, 1974

[54] AIR CONDITIONING SYSTEM FOR A LOCOMOTIVE CAB

[75] Inventor: James F. Rieter, Jr., Glenview, Ill.

[73] Assignee: Vapor Corporation, Chicago, Ill.

[22] Filed: May 21, 1973

[21] Appl. No.: 362,435

[52] U.S. Cl................ 62/285, 62/239, 62/241, 62/244, 62/245, 62/61, 62/288, 165/41
[51] Int. Cl............................. F25d 21/14
[58] Field of Search...62/61, 241, 244, 245, DIG. 16, 62/239, 285, 288, 290; 165/41, 42, 43, 44

[56] References Cited
UNITED STATES PATENTS

| | | | |
|---|---|---|---|
| 2,054,350 | 9/1936 | Weiland | 62/244 |
| 2,161,667 | 6/1939 | Des Roches | 62/285 |
| 2,475,841 | 7/1949 | Jones | 62/239 |
| 2,496,252 | 1/1950 | Norroli | 62/285 |
| 2,737,787 | 3/1956 | Kritzer | 62/259 |
| 2,784,568 | 3/1957 | Schjolin | 62/239 |
| 2,809,812 | 10/1957 | Erickson | 62/239 |
| 2,994,210 | 8/1961 | Millington | 62/285 |
| 3,007,323 | 11/1961 | Millington | 62/244 |
| 3,163,995 | 1/1965 | Maier | 62/241 |
| 3,218,821 | 11/1965 | Spott | 62/239 |
| 3,347,310 | 10/1967 | Lind | 62/239 |

Primary Examiner—William J. Wye
Attorney, Agent, or Firm—Lloyd L. Zickert

[57] ABSTRACT

Air conditioning system for use to cool cabs of large vehicles such as locomotives, which includes a housing divided into upper and lower chambers, the upper chamber mounting the compressor and condenser and being exposed to the ambient, and the lower chamber mounting the evaporator and being exposed to the cab or compartment to be cooled. The condenser is arranged perpendicularly to the path of movement of the vehicle. A condensate tray is provided for the lower chamber to collect and prevent sloshing of the condensate from the evaporator.

5 Claims, 13 Drawing Figures

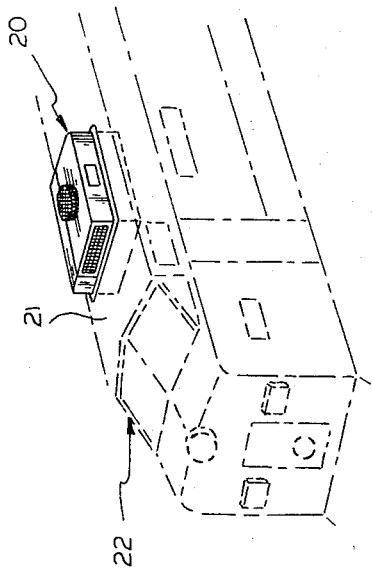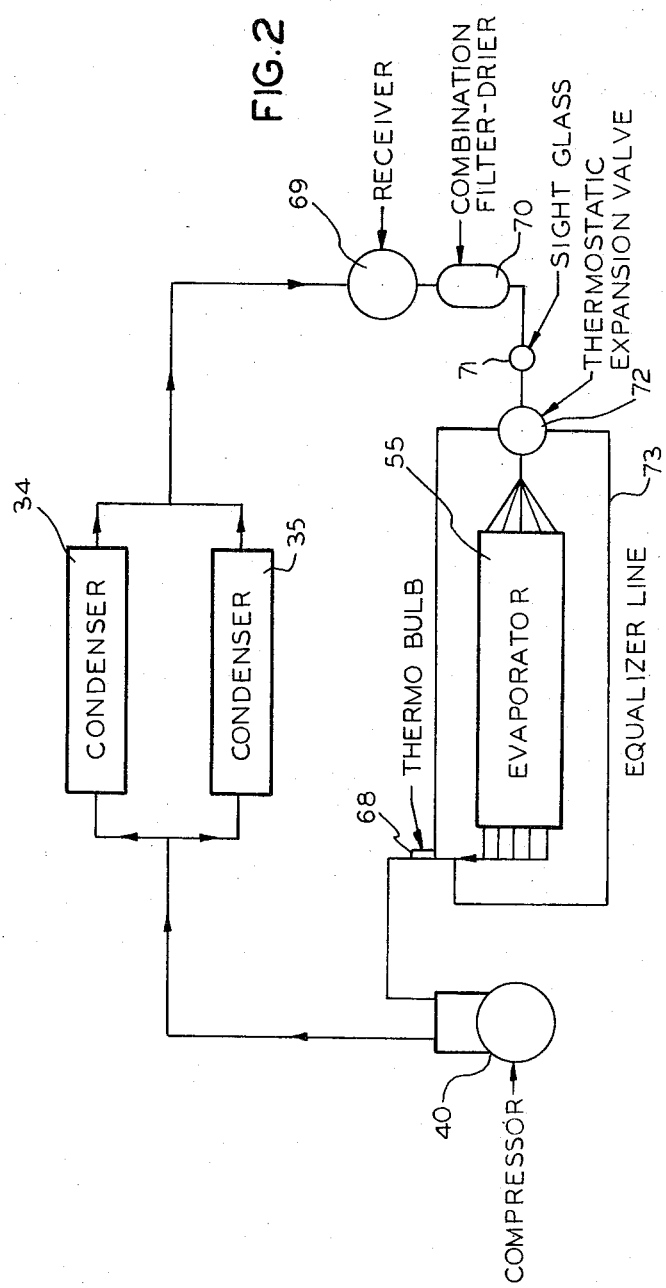

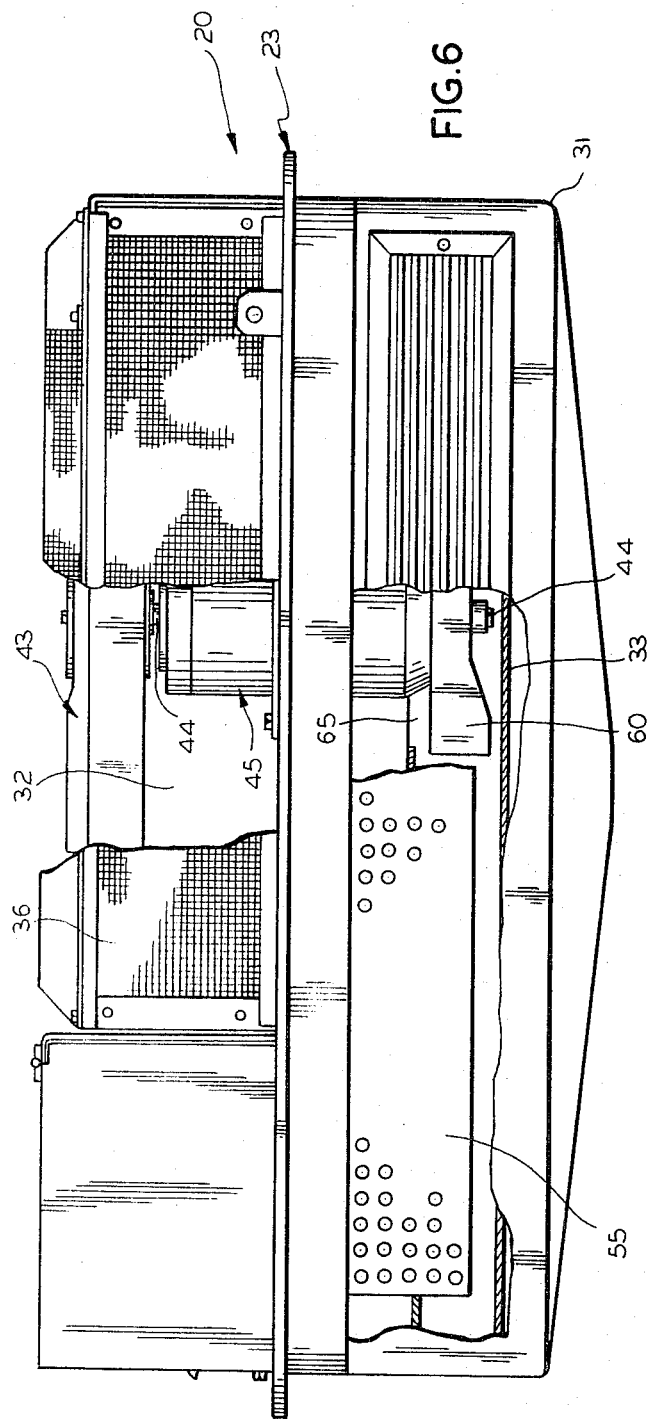
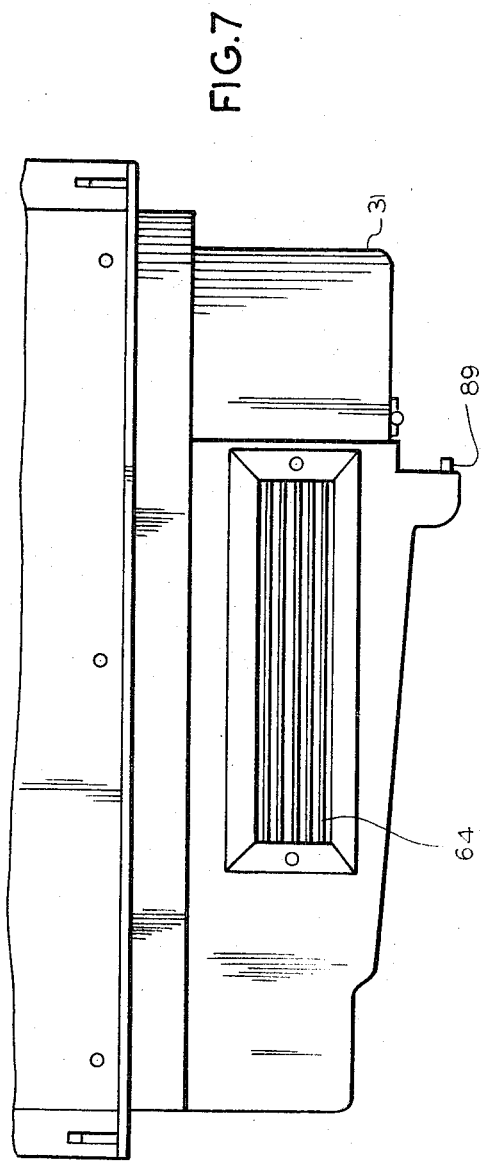

AIR CONDITIONING SYSTEM FOR A LOCOMOTIVE CAB

This invention relates in general to an air conditioning system for cooling cabs of large vehicles and in particular for cooling a locomotive cab.

While air conditioning systems have been heretofore developed for large vehicles, including the cab of a locomotive, problems have been encountered in connection with the circulation of condensing air for rejecting heat from the condenser. Additionally, problems have been encountered in containing evaporator condensate as any leakage would interfere with locomotive personnel, such as the engineer or fireman, caused by the lurching of the locomotive. Moreover, problems have been encountered due to refrigerant leakage when the condenser unit is remotely mounted from the evaporator unit. Further, inasmuch as locomotives have a wide range of speed and travel in both directions, problems have been encountered in efficiently rejecting the heat from the condensing unit.

The air conditioning system of the present invention, while particularly suited for cooling the cab or driving compartment of a locomotive, could also be used in other large vehicles having a cab or driving compartment and where the vehicle would have a wide range of operating speeds. Specifically, the air conditioning system of the invention as a total package is adapted to be mounted in the roof of a cab and includes a central horizontally extending panel, upper and lower covers on the panel defining upper and lower chambers, condensing units and a compressor unit in the upper chamber, and an evaporator unit in the lower chamber. A fan is also mounted in the upper chamber for assisting in the circulation of condensing air through the condenser units, while a blower is mounted in the lower chamber to assist in moving air through the evaporator unit and circulating the air in the cab. The condensing unit includes a pair of condensing coils in parallel spaced relation at the front and back ends of the upper chamber and extending perpendicularly to the longitudinal axis of and the path of movement of the locomotive. The condensing units are connected in parallel and depending upon the direction of travel of the locomotive, the speed and wind direction, usually one of the condensing units rejects more heat than the other. In the event the locomotive is standing still, the condensing units would balance and equally reject the same amount of heat.

The cover for the lower chamber includes a bottom wall that is sloping and formed to collect and drain condensate and prevent sloshing of condensate out of the unit and into the cab. This is important from the standpoint that a locomotive is subject to lurching during travel on rails.

It is therefore an object of the present invention to provide a new and improved air conditioning system for large vehicles and in particular to cool the cab of a locomotive.

Another object of the present invention is in the provision of an air conditioning system for a locomotive which includes an air-cooled condensing unit mounted on the locomotive cab capable of bidirectional operation in that it is split into two condensing coils that are connected in parallel.

It is a further object of the present invention to provide an air conditioning system for a locomotive cab which includes split condensers mounted on the roof of a cab extending perpendicular to the locomotive axis to utilize ram air cooling.

A still further object of the present invention is in the provision of an air conditioning system for cooling the cab of a locomotive which includes a condensate collection and drainage tray that prevents accidental loss of condensate from the evaporator and also prevents leakage of condensate in the cab where it would interfere with operation of the vehicle.

Other objects, features and advantages of the invention will be apparent from the following detailed disclosure, taken in conjunction with the accompanying sheets of drawings, wherein like reference numerals refer to like parts, in which:

FIG. 1 is a perspective phantom view of a locomotive having an air conditioning system according to the invention mounted thereon;

FIG. 2 is a schematic diagram of the refrigeration unit utilized in the air conditioning system of the invention;

FIG. 6 is a front view of the air conditioning system with some parts broken away and other parts removed for purposes of clarity;

FIG. 7 is a fragmentary side elevational view of the air conditioning system and in particular showing the lower part of the system;

Figure 9:
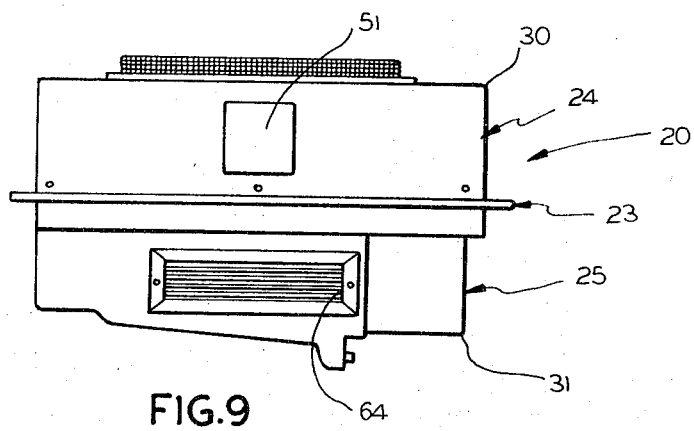
FIG. 9 is a side elevational view of the air conditioning system and showing only one side, the other side of which would be substantially identical.
Figure 10:
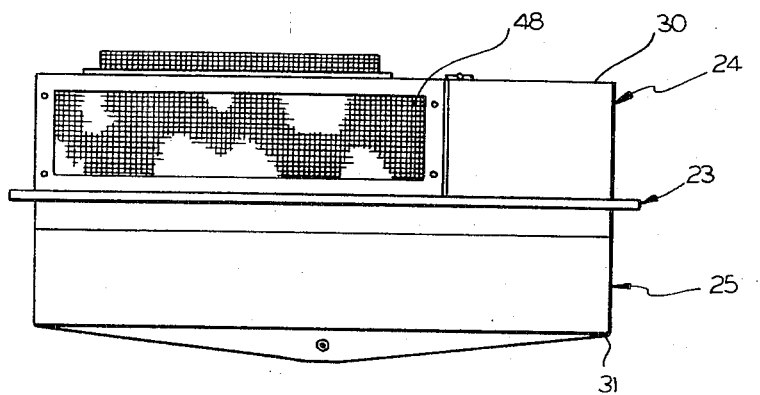
FIG. 10 is a front elevational view of the air conditioning system showing the foreward condenser opening.

Referring now to the drawings and particularly to FIG. 1, the air conditioning system or unit of the present invention is generally designated by the numeral 20 and illustrated as it would be mounted on a locomotive and in particular on the roof 21 of a locomotive cab 22. As particularly seen in FIGS. 8, 9 and 10, the system 20 includes generally a horizontally extending central panel 23 that would be mounted substantially coplanar with the roof 21 of the locomotive cab, an upper section 24 which will include the condensing unit and the compressor unit and be arranged above the roof of the cab and exposed to the outside atmosphere, and a lower section 25 which would include the evaporator unit and be arranged below the roof of the locomotive cab and therefore extend into the cab or compartment. Accordingly, the upper section is exposed to the outside, while the lower section is exposed to the inside. Recirculation of condensing air through the upper section rejects the heat, while recirculation of evaporator air in the lower section absorbs the heat within the cab and effectively cools the cab. While the air conditioning unit will be described in relation to a locomotive cab, it should be appreciated that it could be utilized with other large vehicles to cool compartments where desired.

Figure 3:
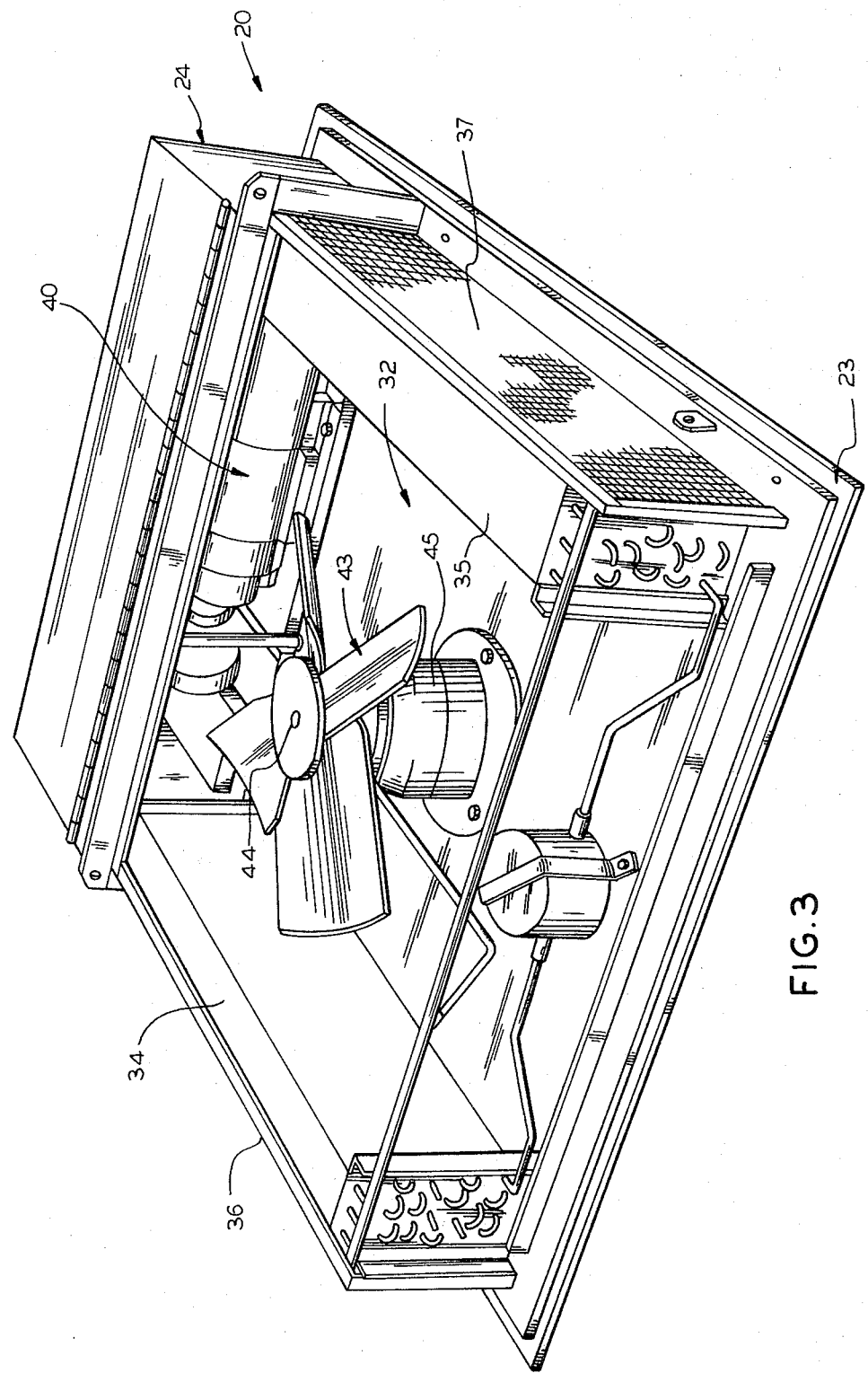
FIG. 3 is a perspective view of the upper part of the air conditioning system of the present invention with the cover removed to show underlying parts.
Figure 4:
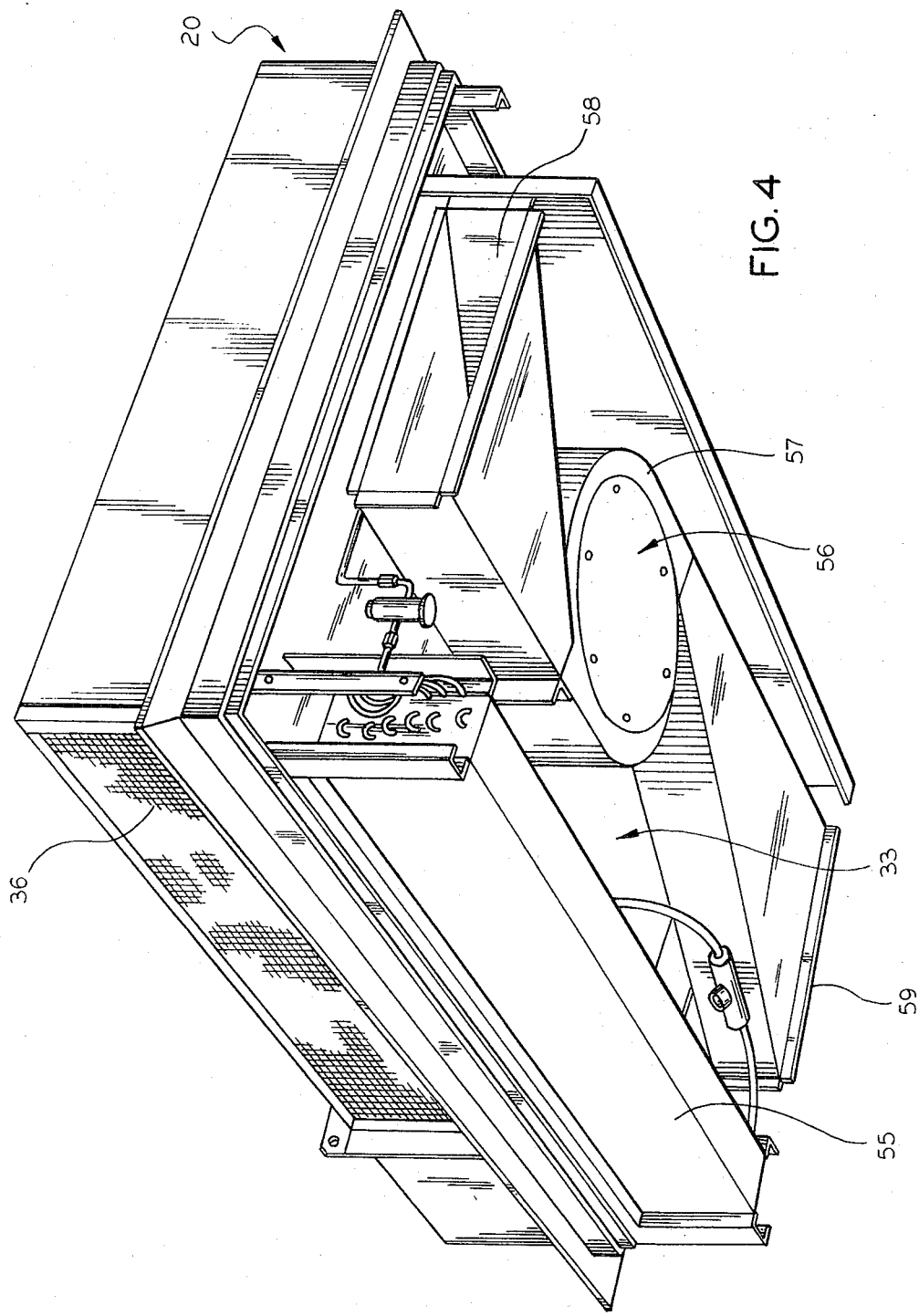
FIG. 4 is a perspective view of the air conditioning system and in particular showing the lower part of the unit with the lower cover removed to show underlying parts.

The upper section 24 includes an upper cover 30, while the lower section 25 includes a lower cover 31, which respectively define, as seen in FIGS. 3 and 4, upper and lower chambers 32 and 33, respectively.

Within the upper chamber 32, parallel spaced heat exchanger condensing coils or units 34 and 35 are mounted at the front and back ends of the chamber and which extend perpendicular to the longitudinal axis of and the path of movement of the locomotive. Accordingly, the condenser of the air conditioning system is split into two units for handling the rejection of heat. The units are connected in parallel and function to equally reject the heat or such that one unit rejects more heat than the other, depending upon the use of the locomotive at any one time. Safety screens 36 and 37 are mounted to the outside of the condensing units to protect them against damage from flying objects or the like during travel of the locomotive. It can be appreciated that one of the condensing units will face forward of the locomotive, while the other will face rearward, and that depending upon the direction of movement of the locomotive a ram air effect will be produced on one or the other of the condensing units.

The upper chamber 32 also houses a compressor unit 40. As seen particularly in FIG. 3, the compressor unit 40 is mounted to one side of the condensing units 34 and 35. It can be appreciated that the compressor unit will also receive some benefit from the recirculation of the condensing air through the upper chamber.

Figure 5:
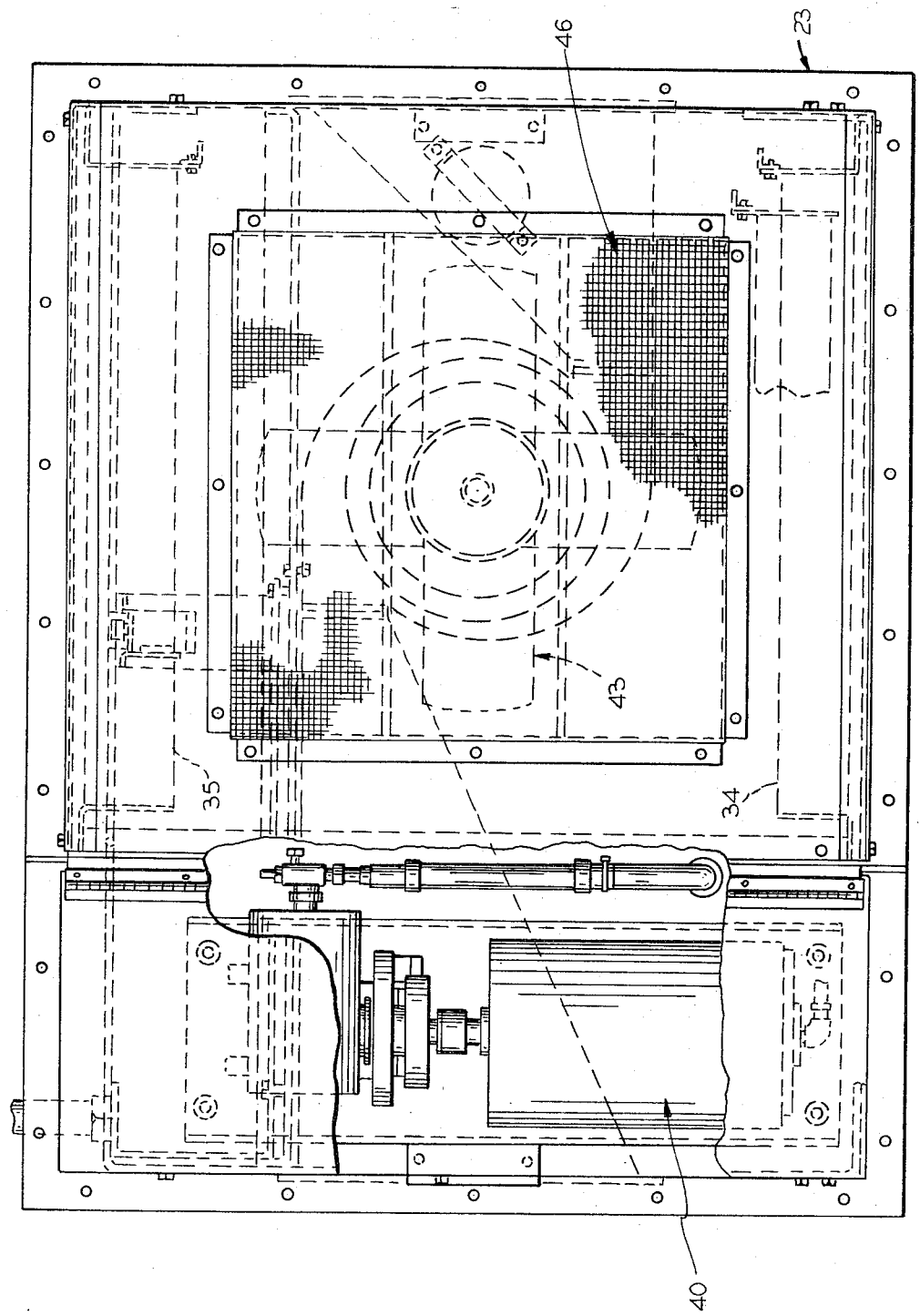
FIG. 5 is a top plan view of the air conditioning system according to the invention with some parts broken away and some parts shown in dotted lines to assist in understanding the invention.

In order to assist in forcing recirculation of condensing air through the condensing units and the upper chamber, a fan 43 mounted on the end of a shaft 44 of a motor 45 is positioned in the upper chamber 32 between the condensing coils 34 and 35 and in alignment with an air discharge opening 46 (FIG. 5) formed in the top wall of the upper cover 30. An air inlet opening 47 (FIG. 8) aligns with the rear condensing unit 34, while an air inlet opening 48 (FIG. 10) aligns with the front condensing unit 35. Accordingly, recirculation of condensing air through the upper chamber 32 is assisted by the fan 43 wherein it moves into the upper chamber through the front and rear air inlet openings 48 and 47, the front and rear condensing units 35 and 34, and out the air discharge opening 46. By placing the condensing units perpendicular to the locomotive axis, ram air cooling is utilized. With the locomotive moving forwardly as speed increases, the forward condensing unit 34 will increase its rejection of heat, while the forced air flow caused by the same maintains adequate rejection of heat from the rear condensing unit 35. In reverse locomotive motion, the forward and rear condensing units essentially change heat rejection capacities. The vertically mounted condenser fan exhausts condensing air which has flowed through one or both of the condensing units vertically from the chamber 32, thereby drawing in cooling air from the front and rear of the upper section. By parallel connecting the condensing units 34 and 35, they are self-balancing, and where rejection of heat from one of the condensing units is greater than the other, the refrigerant flow to that unit is likewise increased.

Inasmuch as high speed operation of the locomotive may cause excessive pressures within the upper chamber, a pressure relief trap door 51 (FIG. 9) may be provided to assist in reducing the pressure level. It should be appreciated that at most speeds the trap door would not be necessary.

The lower section of the air conditioning unit of the invention includes a blower and the evaporator unit. As seen in FIG. 4, the evaporator unit 55 is arranged across one end of the lower chamber 33, while the blower unit 56 is mounted within the lower chamber. The blower unit includes a housing 57 having opposed air discharge outlets 58 and 59. As seen in FIG. 6, an impeller 60 is arranged within the blower housing and mounted on the lower end of the motor shaft 44, it being appreciated that the motor 45 is arranged partly in the upper chamber 32 and partly in the lower chamber 33. Accordingly, a single motor is utilized to drive the condensing fan and the evaporator blower.

Figure 8:
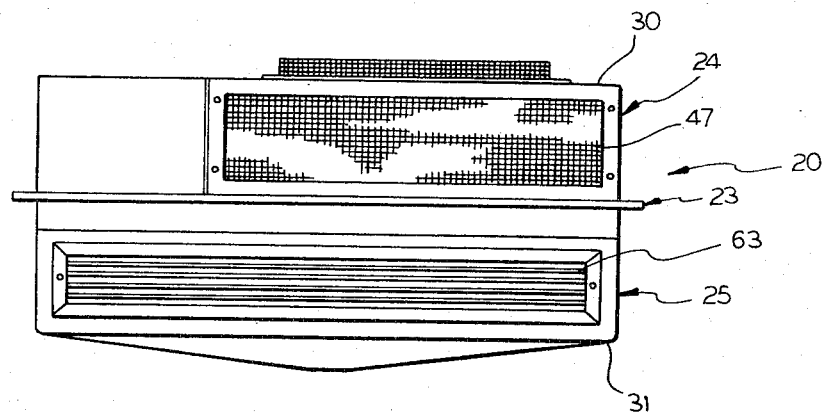
FIG. 8 is a rear view of the air conditioning system according to the invention illustrating in particular the rear condenser opening and the evaporator air inlet.

The lower cover 31, as seen in FIG. 8, includes an air inlet opening 63 at the rear end of the cover which aligns with the heat exchanger evaporator unit 55. Air outlet openings 64 are provided at opposite sides of the lower cover, FIG. 7, to align with the opposed air discharge outlets 58 and 59 of the blower housing 57. While not shown, it can be appreciated that the inlet to the blower housing is provided on the upper side of the housing adjacent the central panel 23 and in communication with the lower chamber 33 and in an area indicated by the numeral 65 in FIG. 6.

Vapor cycle refrigeration is used although others of a suitable type could be used. The refrigerant circuit is that shown in FIG. 2 wherein the compressor 40 is connected on one side to the split condenser units 34 and 35 and on the other side to the evaporator 55 and a thermo bulb 68. The condensers are in turn connected to a receiver 69 and in series with a combination filter-drier 70, a sight glass 71 and a thermostatic expansion valve 72, which is in turn connected to the evaporator and an equalizer line 73.

Figure 11:
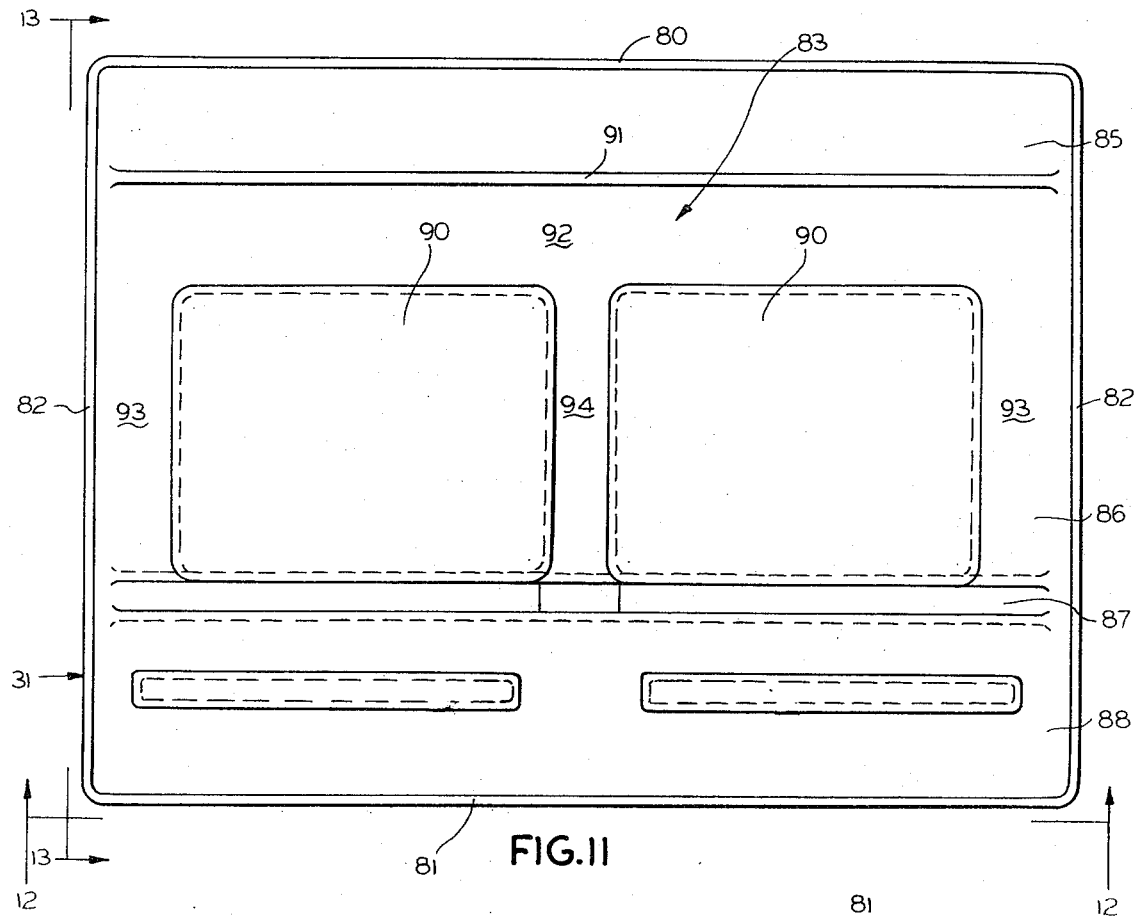
FIG. 11 is a top plan view of the lower cover of the air conditioning system for illustrating the condensate collection and drainage tray and for illustrating the manner in which condensate is prevented from sloshing in the tray.
Figure 12:
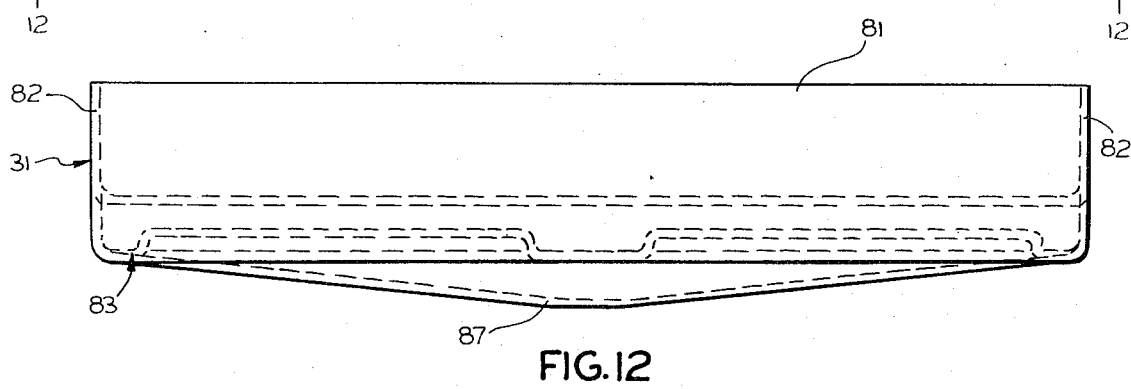
FIG. 12 is a front elevational view of the lower cover taken substantially along line 12—12 of FIG. 11.
Figure 13:
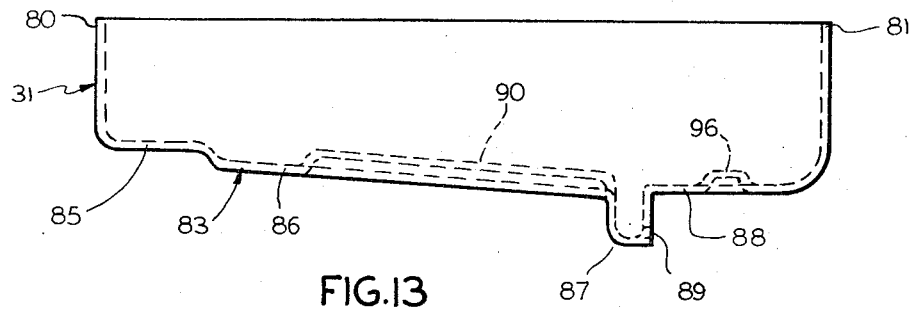
FIG. 13 is a side elevational view of the lower cover taken substantially along line 13—13 of FIG. 11.

The lower cover 31, while serving to cover the evaporator unit and blower, more importantly serves as a condensate tray or drip pan where the condensate formed when humid air is pumped through the evaporator unit must be collected and disposed of. The bottom cover is formed to handle the condensate collection for drainage from the tray and also to prevent sloshing and spillage of condensate from the bottom cover. Preferably, the lower cover 31 is vacuum formed from a suitable plastic. It is illustrated in its roughest form following vacuum forming in FIGS. 11 to 13 wherein it generally includes front and back walls 81 and 80, opposed side walls 82 and a bottom wall 83. It will be understood that the rough illustration of FIGS. 11 to 13 do not show the evaporator air inlet opening 63 in the rear wall 80 or the blower air outlet openings 64 in the side walls 82 for purposes of simplicity.

The bottom wall 83 includes a forward ledge 85 extending between the opposite side walls and slightly rearwardly of the rear wall 80. Extending rearwardly from the forward ledge 85 and at a lower level is a sloping wall portion 86 that slopes to a drain channel 87 extending transverse the cover between the side walls 82. A foremost wall portion 88 extends between the drain channel 87 and the front wall 81. As seen particularly in FIG. 12, the drain channel 87 is pitched to a low spot at the center point from the opposite side walls so that the condensate collected drains to the center of the drain channel where an outlet 89 may be suitably connected to a drain line. Accordingly, as condensate falls into the lower cover which constitutes a drip pan, it is collected in the drain channel or collection channel 87 and then drained to waste.

In order to prevent sloshing of the condensate as it is being collected, channelways are formed in the bottom wall to contain movement of the condensate as it is being collected. Rectangularly shaped raised portions 90 arranged in side-by-side relation along the sloping wall portion 86 coact with a lip 91 and the side walls 83 to define a transversely extending channel 92 that extends between the side walls and longitudinally extending channelways 93. A channelway 94 is defined between the raised portions 90. The channelways 93 and 94 drain condensate to the drain channel 87. The evaporator unit extends at the rear end of the lower cover between the side walls and generally over the forward ledge 85. Normally, all of the condensate will drain along the sloping wall portion 86 and collect in the drain channel 87. Therefore, it is seen that the bottom wall of the lower cover is formed to prevent motion of the condensate free surface, thereby preventing leakage and spillage which could possibly distract the crew if water is thrown through outlet openings of the lower cover. The anti-sloshing effect is quite important where the air conditioning system of the invention is mounted in a powered vehicle, such as a locomotive.

It will be understood that modifications and variations may be effected without departing from the scope of the novel concepts of the present invention, but it is understood that this application is to be limited only by the scope of the appended claims.

The invention is hereby claimed as follows:

1. An air conditioning system for a locomotive cab to be mounted in the roof of the locomotive cab, said system comprising a frame including a centrally and horizontally arranged panel, upper and lower covers on the top and bottom sides of the panel defining upper and lower chambers, the upper chamber being generally positioned above the roof and exposed to the atmosphere, the lower chamber being generally positioned below the roof and within the cab, a pair of heat exchanger condensing units in the upper chamber one at each the front and back ends thereof and extending vertically and perpendicular to the longitudinal axis of and the path of movement of the locomotive, means connecting said condenser units in parallel, a compressor unit in the upper chamber along one side thereof, air inlet openings in the upper cover at the front and back walls aligning with the condenser units, an air discharge opening in the upper cover, a fan in the upper chamber between the spaced condenser units arranged to draw air into the chamber through the condenser units and expel air through the air discharge opening, a heat exchanger evaporator unit in the lower chamber, an air inlet opening in the lower cover for the lower chamber aligned with said evaporator unit to allow air to move from the cab through the evaporator unit and into the lower chamber, air discharge opening means in the lower cover, a blower in the lower chamber including a housing having an inlet communicating with the lower chamber and outlet means communicating with the air discharge opening means to pull air through the evaporator unit and expel it through the discharge opening means into the cab.

2. An air conditioning system as defined in claim 1, wherein the bottom wall of the lower cover slopes and includes means for collecting and draining condensate having a plurality of separated condensate channels which inhibit sloshing of condensate, a condensate collection channel adjacent one end of the bottom wall, means formed on the bottom wall to define a plurality of drain channels feeding to said collection channel, and an outlet opening in said collection channel.

3. An air conditioning system for a locomotive cab to be mounted in the roof of the locomotive cab, said system comprising a frame including a centrally and horizontally arranged panel, upper and lower covers on the top and bottom sides of the panel defining upper and lower chambers, the upper chamber being generally positioned above the roof and exposed to the atmosphere, the lower chamber being generally positioned below the roof and within the cab, a heat exchanger condenser unit in the upper chamber, an air inlet opening in the upper cover aligning with said condenser unit, an air discharge opening in the upper cover, a fan in the upper chamber arranged to draw air into the chamber through the condenser unit and expel air through the air discharge opening, a heat exchanger evaporator unit in the lower chamber, an air inlet opening in the lower cover for the lower chamber aligned with said evaporator unit, an air discharge opening in the lower cover, a blower in the lower chamber for forcing air through the air inlet opening across the evaporator unit into the lower chamber and out through the air discharge opening into the cab, and said cover including side and bottom walls, said bottom wall having a sloping surface and means for collecting condensate and preventing sloshing of condensate onto said evaporator unit, and said means for collecting and preventing sloshing of condensate includes a condensate collection channel adjacent one end of the bottom wall, means formed on the bottom wall to define a plurality of drain channels feeding to said collection channel, and an outlet opening in said collection channel.

4. In an air conditioning system for a heavy vehicle, a condensing unit mounted on the upperside of the cab roof of the vehicle, said unit comprising a casing having opposed front and back walls extending perpendicular to the path of movement of the vehicle, opposed side walls and a top wall, air flow openings in the front and back walls and the top wall, a pair of condensing coils, one adjacent to and aligned with each of the front and back walls, means connecting said coils in parallel to split the cooling load therebetween, a fan mounted between said coils moving air upwardly through the opening in the top wall and drawing air flow through said condensing coils, and a pressure relief trap door.

5. In an air conditioning system for a heavy vehicle, an evaporator unit mounted on the underside of the cab roof of the vehicle, said unit comprising a casing having opposed front and back walls, opposed side walls and a bottom wall, the front and back walls extending perpendicular to the path of movement of the vehicle, an evaporator coil extending between said opposed side walls and adjacent the front wall, an air inlet opening in the front wall aligned with said coil, a blower within said casing having an inlet communicating with the air in the casing, air discharge openings in said side walls, said blower having outlets communicating with said air discharge openings, said bottom wall sloping toward the back wall of the casing, a drain in the bottom wall, and means on the bottom wall for collecting and preventing sloshing of the condensate free surface including a condensate collection channel adjacent one end of the bottom wall, means formed on the bottom wall to define a plurality of drain channels feeding to said collection channel, and an outlet opening in said collection channel.

* * * * *